United States Patent [19]

Venema

[11] 4,177,649

[45] Dec. 11, 1979

[54] SURGE SUPPRESSION APPARATUS FOR COMPRESSOR-DRIVEN SYSTEM

[75] Inventor: Harry J. Venema, Wheaton, Ill.

[73] Assignee: Borg-Warner Corporation, Chicago, Ill.

[21] Appl. No.: 847,635

[22] Filed: Nov. 1, 1977

[51] Int. Cl.² ............................................. F25B 1/00
[52] U.S. Cl. ....................................... 62/209; 62/228; 417/43
[58] Field of Search ............... 62/228 B, 209, 228 D, 62/115; 415/1; 417/43

[56] References Cited

U.S. PATENT DOCUMENTS

| | | | |
|---|---|---|---|
| 2,709,036 | 5/1955 | Stephenson | 62/402 X |
| 2,963,878 | 12/1960 | Beggs et al. | 62/197 X |
| 2,983,111 | 5/1961 | Miner et al. | 62/228 B X |
| 3,555,844 | 1/1971 | Fleckenstein et al. | 62/228 D |
| 3,803,863 | 4/1974 | Jednacz et al. | 62/209 |
| 3,994,623 | 11/1976 | Rutshtein et al. | 417/23 |
| 4,046,490 | 9/1977 | Rutshtein et al. | 415/1 X |

*Primary Examiner*—William E. Wayner
*Attorney, Agent, or Firm*—James E. Tracy

[57] ABSTRACT

Surge in a compressor-driven system, such as a refrigeration system, is precluded by sensing an appropriate parameter, for example the gas flow at the compressor discharge outlet, and developing therefrom a feedback signal which dynamically varies the capacity of the compressor so that the discharge pressure versus discharge flow rate characteristic curve of the compressor always has a negative slope at the operating point, regardless of where that point is located on the curve. By providing a negative slope at all operating conditions, the system is incapable of surge. In order to satisfy variable load requirements, the compressor capacity is adjusted to vary the steady state operating point on the characteristic curve.

12 Claims, 2 Drawing Figures

SURGE SUPPRESSION APPARATUS FOR COMPRESSOR-DRIVEN SYSTEM

BACKGROUND OF THE INVENTION

This invention relates to control apparatus for controlling the operation of a compressor in a compressor-driven system to avoid stall or surge in the system and to improve efficiency. The invention is susceptible of widely diverse use and may be applied to any system having equipment driven by a compressor, such as a turbine, pump, fan, jackhammer, electric generator, jet engine, etc. It is particularly useful when incorporated in refrigeration equipment and will be described in that environment.

Various systems have been developed for preventing surge in large capacity turbocompressors, such as of the centrifugal or axial type. Surge or surging is an undesirable condition that may occur when, for example, the gas velocity through the compressor drops below a given minimum. It is an oscillation or the onset of oscillation in which the gas flow will speed up and slow down alternately, and it may even reverse its direction through the compressor. Surging causes excessive vibrations and noise, and may cause permanent damage to the compressor. Unfortunately, all of the previous attempts to avoid surge have substantially lessened the compressor efficiency. For example, in one prior control system, when the possibility of surging exists gas is bypassed from the discharge side to the suction side or is merely passed through a blow-off line. In another system, guide vanes at the compressor inlet (usually called prerotation vanes or PRV) are adjusted, when a surging condition is approached, to introduce drag or resistance to the gas flow in an amount sufficient to prevent surging.

These prior solutions to the surge problem employ passive and inefficient mechanical mechanisms that dissipate considerable energy. The surge prevention arrangement of the present invention, on the other hand, constitutes a significant improvement over the systems developed heretofore since essentially no energy is needed to keep the compressor-driven system out of surge. Moreover, additional economies are realized in that the construction of the compressor may be simplified considerably from that which is usually required.

SUMMARY OF THE INVENTION

The energy-efficient control system of the invention dynamically controls surge in a compressor-driven system wherein gas flows through a containment circuit including an adjustable capacity compressor, such as a variable speed compressor. The discharge pressure of the gas at the compressor outlet varies as a function of the gas flow rate. Means are provided for adjusting the capacity of the compressor to select the steady state operating point on the discharge pressure versus flow rate characteristic curve. Sensing means senses a predetermined parameter (such as the compressor output flow) and means, operating in response to the sensing means, develops a feedback signal which is a function of the sensed parameter. Regulating means responds to the feedback signal for dynamically varying the capacity of the compressor to vary the instantaneous operating point alternately back and forth around the steady state operating point and to effect a negative slope to the portion of the pressure-flow curve over which the instantaneous operating point dynamically varies. By effectively forcing the pressure-flow curve to have a negative slope at the operating point, regardless of where that point occurs, the compressor-driven system is prevented from surging and the operation is stabilized.

DESCRIPTION OF THE DRAWING

The features of the invention which are believed to be novel are set forth with particularity in the appended claims. The invention may best be understood, however, in its application to a refrigeration system by reference to the following description in conjunction with the accompanying drawing in which:

DESCRIPTION OF THE ILLUSTRATED EMBODIMENT

Figure 1:
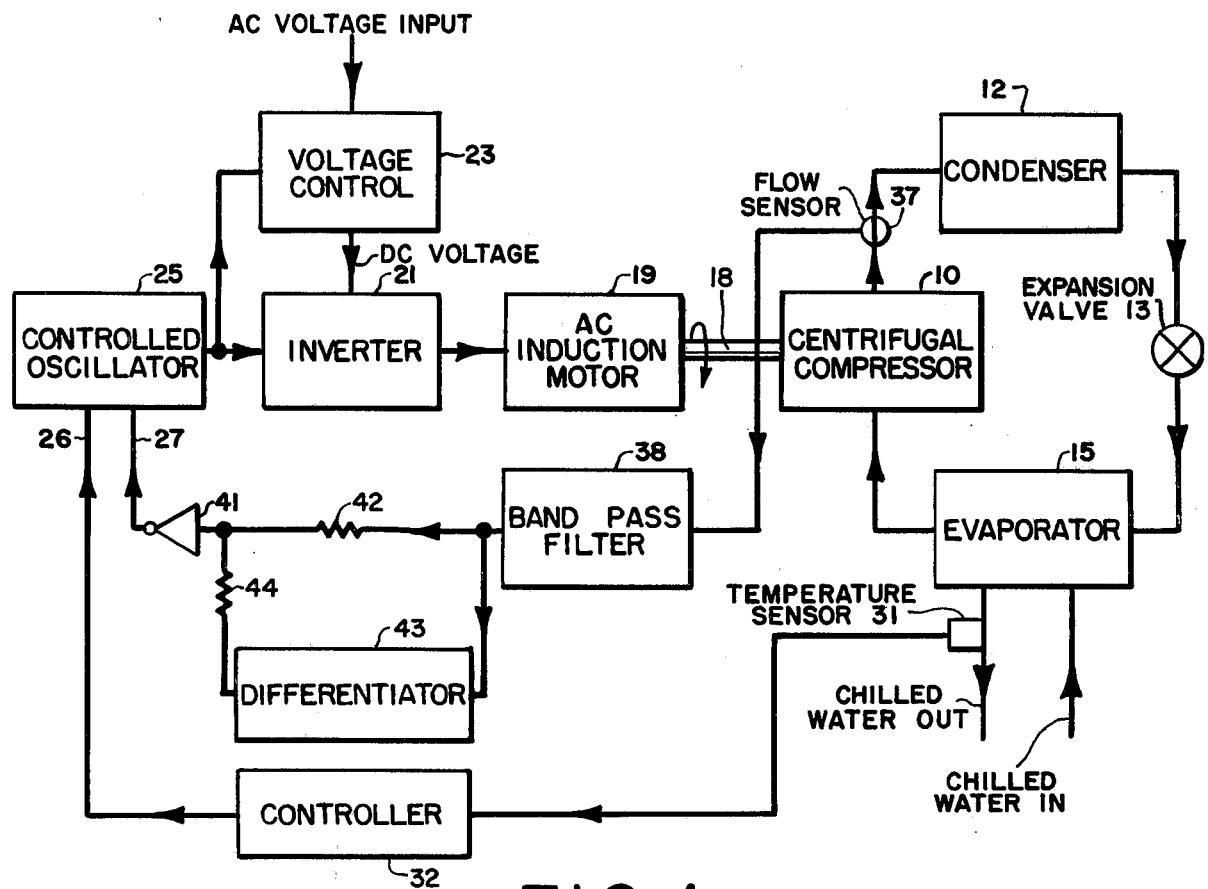
FIG. 1 schematically illustrates a control system constructed in accordance with one embodiment of the invention and incorporated in a refrigeration system, shown specifically as a large-capacity air-conditioning system capable of air-conditioning a large building.

The disclosed air-conditioning system includes a compressor 10, a condenser 12, an expansion device or valve 13 and an evaporator 15, the four components being intercoupled in series to form a conventional closed refrigeration circuit. Since a centrifugal type compressor is particularly susceptible to surging, compressor 10 is illustrated as a centrifugal compressor. It will be assumed that the refrigeration equipment is of the large-capacity variety such as might be employed in air conditioning a large building. Refrigerant gas is compressed in compressor 10 and the compressed fluid is supplied to condenser 12 where a cooling medium, such as air or water, causes the compressed gas to condense to liquid refrigerant which then expands as it flows through expansion valve 13, emerging as a two-phase mixture of liquid and gas but primarily a liquid. Evaporator 15 will usually be in heat exchange relation with circulating water in a liquid chiller. As the two-phase refrigerant flows through evaporator 15, heat is transferred from the circulating water to the refrigerant and the entirety of the refrigerant vaporizes and assumes its gaseous state for delivery to the suction inlet of the compressor. The water is thus chilled in the evaporator and may then be used to cool the building.

In order to vary the amount of cooling imparted to the building as is necessary when the cooling requirements or load demand changes, the capacity of compressor 10 is effectively made adjustable to regulate the flow rate of the refrigerant through the refrigeration circuits to vary the refrigeration capacity. This may be accomplished by constructing compressor 10 to have a variable displacement which is controlled in accordance with the variable load requirements. It is preferred, however, that the capacity of compressor 10 be regulated merely by varying its speed. To this end, centrifugal compressor 10 is coupled over shaft 18 to AC induction motor 19 which in turn is driven by inverter 21. The inverter receives, from voltage control circuit 23, a DC input voltage of variable magnitude which determines the amplitude of the inverter AC output voltage. The frequency of the inverter output voltage is determined by the pulse repetition frequency of timing pulses produced by controlled oscillator 25 which in turn is controlled by the amplitudes of control signals applied to its inputs 26 and 27. When the amplitude of either control signal changes, the oscillating frequency varies and the frequency of the timing pulses, applied to inverter 21, changes. The timing pulses from controlled oscillator 25 are also applied to voltage control circuit 23 so that the magnitude of the DC voltage applied to the inverter will be directly proportional to the frequency of the timing pulses supplied to the inverter. In this way, the ratio of the DC voltage to the timing signal frequency will be relatively constant at all times.

Of course, the circuits employed for varying the rotational speed of motor 19, and consequently compressor 10, may be of conventional construction. As is well known, the speed of motor 19 is directly proportional to the frequency of the timing pulses provided by oscillator 25. Hence, as the speed control information supplied to the oscillator varies, the speed of compressor 10 changes.

Oscillator 25 is controlled over its input 26 in order to modulate the compressor speed to match the refrigeration capacity to the cooling requirements or load demand. This may be achieved, for example, by monitoring the temperature of the chilled water discharged from the evaporator and controlling the oscillator such that the compressor capacity is appropriately changed to maintain the temperature of that chilled water relatively constant at a desired set point temperature. In FIG. 1, the control arrangement is schematically illustrated by temperature sensor 31 and controller 32. The controller, which is adjustable to establish the desired set point temperature, compares the temperature information signal from sensor 31 with the set point information and produces from the comparison a control signal for application to input 26. The control signal will vary the frequency of the timing pulses as necessary to regulate the compressor speed so that the refrigeration capacity changes appropriately to hold the chilled discharge water at the selected set point temperature.

More specifically, when the refrigeration system is initially turned on, the temperature of the circulating water will be above the set point temperature and controller 32 will cause the compressor to rotate at its maximum speed so that the refrigeration capacity is maximized. As the cooling load is then satisfied and the building cools down to the desired temperature, the temperature of the chilled water leaving evaporator 15 drops below the set point and the amplitude of the control signal from controller 32 changes in the direction to reduce the frequency of oscillator 25, thereby decreasing the speed and capacity of compressor 10. The refrigerant flow rate through evaporator 15 therefore decreases and less cooling is imparted to the water in the liquid chiller. Assuming that the load demand remains constant, the system will stabilize at an operating point so that the chilled water will be just cold enough to maintain the building at the desired temperature.

If there is now an increase in the cooling requirements (assume the outside temperature increases) and the building tends to become warmer than desired, the temperature of the chilled water increases, whereupon the amplitude of the control signal applied to input 26 changes to increase the oscillating frequency, and consequently the compressor speed, until the system stabilizes around a new and higher operating point. A decreased cooling load, on the other hand, causes the chilled water to become colder than desired, as a result of which the oscillating frequency and compressor speed decrease and the refrigerant flow rate drops to a lower operating point. Hence, a demand responsive arrangement is provided for adjusting the capacity of the compressor to establish the steady state flow rate which is needed to meet the load demand.

As in the case of circuits 21, 23 and 25, the construction of controller 32 is readily apparent to one skilled in the art. Any additional details would only unnecessarily encumber the application. Reference may be made to the teachings in copending patent application Ser. No. 816,428, filed July 18, 1977, in the name of Kenneth J. Kountz et al, and assigned to the same assignee as the present invention, for a specific illustration and explanation of one form that the circuits herein may take. In that copending application, a refrigeration system is shown wherein the speed of an inverter-driven centrifugal compressor is made a function of the temperature of the chilled water discharged from the evaporator in order to regulate the compressor speed, and consequently its capacity, to meet the cooling requirements placed on the refrigeration system. The circuits shown in detail in the copending application, with slight modifications readily apparent to one skilled in the art, may be incorporated into the system of the present application.

Figure 2:
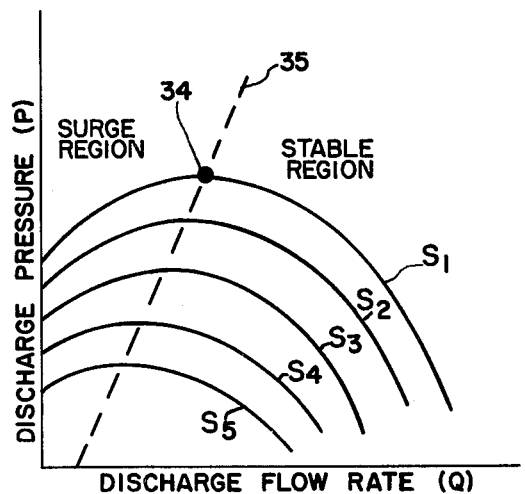
FIG. 2 depicts discharge pressure (P) versus flow rate (Q) characteristic or performance curves that will be helpful in understanding the operation of the surge control system and the manner in which that control system distinguishes from the prior art.

Consideration will now be given to the invention and how it distinguishes from the prior art. Initially, attention should be directed to FIG. 2 which is a compressor performance diagram that depicts a family of five characteristic or performance curves $S_1$-$S_5$ showing the manner in which the discharge pressure of the refrigerant in a typical variable speed centrifugal compressor varies as a function of the refrigerant flow rate at the discharge outlet, each of the five curves $S_1$-$S_5$ being the locus of possible operating points for a respective one of five different compressor speeds, curve $S_1$ illustrating the performance at the highest compressor speed. When the speed is maintained constant at any given level, one well known way of varying the flow rate is to adjust prerotation guide vanes at the compressor inlet. Of course, the characteristic curves would differ somewhat with different compressor designs and models but they would all vary in the general pattern represented in FIG. 2. At any given compressor speed, at low flow rates the pressure across the compressor increases as the flow increases until it reaches a maximum level or crest, whereupon increasing the flow rate causes that pressure to drop. For example, when the centrifugal compressor is rotating at its maximum speed, as depicted by curve $S_1$, the discharge pressure increases as the flow rate increases to the point indicated by reference numeral 34. Further increases in flow rate reduces the discharge pressure.

Hence, characteristic curve $S_1$ has a positive slope to the left of point 34 and a negative slope to the right of that point. It is well known in the art that a compressor should never be operated on the positive slope portion of its characteristic curve, the positive slope portion effectively constituting a negative resistance area. Otherwise, the compressor will have a potential to surge. Dashed construction line 35 passes through the crests (or zero slope portions) of each of the five curves and divides the compressor performance diagram into surge and non-surge or stable regions. Until the present invention, to prevent surge a refrigeration system was always controlled in one way or another by means of some energy consuming passive device.

For the first time, the present invention permits operation, without surge and without the use of an energy consuming device, at any point within the compressor performance diagram, even when the refrigerant flow rate through the compressor is very low. This is achieved by dynamically varying the capacity of compressor 10 so that the slope of the discharge pressure versus discharge flow rate characteristic curve is always negative at the operating point, regardless of where that point is located. The compressor capacity established by controller 32 in response to the chilled water temperature (and thus in response to the load demand) determines the steady stage operating point on the characteristic curve. Capacity variations, and consequently shifting of the steady state operating point, caused by water temperature changes occur relatively slowly. The dynamic variations imposed on compressor 10, in accordance with the invention, occur very fast by comparison and cause the instantaneous operating point to vary alternately back and forth around the steady stage operating point, the characteristic curve being effectively purposely shaped, in the range or portion over which the instantaneous operating point varies, to have a negative slope so surge cannot exist. Dynamically varying the instantaneous operating point around a steady state point may be likened to the manner in which an ac input signal varies or swings around the bias point on the transfer characteristic curve of an amplifier.

To understand the operation of the invention, it is important to realize that surging is basically an oscillation, the equation of an oscillator being:

$$e^{\alpha t} \sin \omega t$$

where $\alpha$ is the attenuation constant. When the exponent $\alpha t$ of the exponential term is positive, the amplitude of the oscillations will increase with time. On the other hand, by making that exponent negative at all times the amplitude of the oscillations will decrease with time. Increasing oscillation amplitude constitutes surge, whereas decreasing oscillation amplitude results in stability. Various feedback arrangements may be provided to insure that the exponent $\alpha t$ is always negative. Preferably, this is accomplished by sensing a predetermined parameter or operating condition which is subject to substantial variations if surging occurs, and developing therefrom a feedback signal, for application to input 27, which is a function of the sensed parameter and will cause the compressor capacity to vary in such a dynamic fashion that the exponent will be negative, thereby forcing the discharge pressure versus flow rate curve to have a shape such that a negative slope exists at the operating point. The sensed parameter may, for example, be the power supplied to the compressor motor, the suction pressure at the compressor inlet, or the discharge flow rate at the compressor outlet. In the illustrated embodiment, the compressor output flow is monitored by flow sensor 37 which produces a signal representative thereof. Noise components (flow variations) in the discharge flow will produce a wide range of frequency components in the signal developed by the flow sensor 37. Since only a very narrow band of those frequency components are needed to produce the necessary feedback signal, band pass filter 38 is provided to select the desired frequency band, which is preferably the band from two to three cycles per second or hertz depending on the gas circuit system response characteristics.

The precise characteristics of the feedback signal depend on the specific design of the centrifugal compressor. For example, when the compressor takes the form of York's Model T-95 turbocompressor, manufactured by the York Division of Borg-Warner Corporation, the assignee of the present invention, it has been found that the feedback signal should be negative, having one component proportional to a change in the discharge flow rate and another component which is a derivative of the flow rate change. More specifically, the negative feedback signal $\Delta\omega_o$ should satisfy the equation:

$$\Delta\omega_o = -0.2\Delta Q - 0.02(d\Delta Q/dt)$$

To develop the necessary feedback signal for application to input 27 of controlled oscillator 25, the output signal of band pass filter 38 is supplied to the input of inverting amplifier 41 via two parallel paths, one including a series resistor 42 and the other including a differentiator 43 and a series resistor 44. The resistance of resistor 42 should be ten times greater than that of resistor 44. Of course, when a different type or model compressor is incorporated in the refrigeration system, the make-up of the circuitry between band pass filter 38 and input 27 will be different. Its specific construction may be mathematically determined, however, in the same manner in which the illustrated circuitry is determined. Basically, one method is to write the equations of the pressure drops and flow around the refrigeration circuit or loop, and from these equations the characteristics of the feedback signal, necessary to prevent oscillation, may be found.

The feedback signal applied to input 27 thus varies the frequency of the timing pulses applied to inverter 21 and regulates the compressor speed and capacity on a dynamic basis so that the instantaneous operating point on the pressure—flow curve effectively alternates back and forth around the steady state operating point, the range or portion of the curve over which the instantaneous operating point dynamically varies always having a negative slope so that surging is made impossible and the sensed parameter (compressor dishcarge flow) is maintained relatively constant to stabilize the operation of the refrigeration system.

It will now be appreciated that surge suppression is achieved with minimum energy consumption. This is in sharp contrast with the prior compressors wherein some energy-dissipating mechanism, such as prerotation guide vanes, must be employed to prevent the system from surging. In this connection, it is to be particularly noted that the active dynamic control of surge, taught in the present application, results in substantial cost savings since no expensive passive mechanical mechanisms are needed in the surge control system. Hence, compressor 10 may be constructed without the prerotation vanes that are customarily incorporated in current centrifugal turbocompressors.

While a particular embodiment of the invention has been shown and described, mofifications may be made, and it is intended in the appended claims to cover all such modifications as may fall within the true spirit and scope of the invention.

I claim:

1. A control system for dynamically controlling surge in a compressor-driven system wherein gas flows through a containment circuit including an adjustable capacity compressor, the discharge pressure of the gas at the compressor outlet varying as a function of the gas flow rate, comprising:

means for adjusting the capacity of the compressor to select the steady state operating point on the discharge pressure versus flow rate characteristic curve;

sensing means for sensing a predetermined parameter which is subject to substantial variations if surging occurs;

means, responsive to said sensing means, for developing a feedback signal which is a function of said predetermined parameter; and regulating means responsive to said feedback signal for dynamically varying the capacity of the compressor to vary the instantaneous operating point alternately back and forth around the steady state operating point and to effect a negative slope to the portion of the pressure-flow curve over which the instantaneous operating point dynamically varies, thereby preventing surge and stabilizing the operation of the compressor-driven system.

2. A control system according to claim 1 wherein said predetermined parameter is the discharge flow of the gas at the compressor outlet, the flow rate being sensed by said sensing means.

3. A control system according to claim 2 wherein said feedback signal is a negative feedback signal having one component proportional to a change in the discharge flow rate and another component which is a derivative of the flow rate change.

4. A control system according to claim 2 wherein said sensing means produces an output signal representing the discharge flow rate and having a range of frequency components and wherein a band pass filter selects only a narrow band of those frequency components from which said feedback signal is developed.

5. A control system according to claim 1 wherein said compressor-driven system is a refrigeration system, said containment circuit is a closed refrigeration circuit and said gas is refrigerant gas, said sensing means sensing the discharge flow of the refrigerant gas at the compressor outlet.

6. A control system according to claim 1 wherein said regulating means modulates the speed of the compressor to vary its capacity.

7. A control system according to claim 6 wherein the compressor is a centrifugal compressor rotated at a variable speed by an AC motor which receives an AC voltage from an inverter, the frequency of the inverter output voltage being determing by said feedback signal.

8. A control system according to claim 1 in which said adjusting means automatically changes the compressor capacity and the steady state operating point on the discharge pressure versus flow rate curve to match the compressor capacity to the load requirements, the compressor capacity changes made in accordance with the load requirements occurring very slowly compared to the dynamic variations caused by said feedback signal.

9. A control system according to claim 8 wherein said compressor-driven system is a refrigeration system, said containment circuit being a closed refrigeration circuit which also includes an evaporator, and in which said adjusting means responds to the temperature of chilled water discharged form the evaporator and causes the compressor capacity to adjust so that the chilled water is maintained relatively constant at a desired set point temperature.

10. A surge control system for preventing surge in a refrigeration system wherein refrigerant flows through a closed refrigeration circuit including a variable speed compressor, a condenser and an evaporator, comprising:

means, including a flow sensor at the compressor outlet, for developing a signal which is a function of the discharge flow rate of the refrigerant at the compressor outlet; and means responsive to said signal for dynamically varying the speed of the compressor to change its capacity to prevent surge, thereby stabilizing the operation of the refrigeration system.

11. Control apparatus for dynamically controlling surge in a compressor-driven system wherein a variable flow rate is required for the compressed fluid, produced by the compressor, to satisfy a variable load demand imposed on the system, the discharge pressure of the fluid at the compressor outlet varying as a function of the discharge flow rate, comprising:

demand responsive means for adjusting the capacity of the compressor to select the steady state operating point on the discharge pressure versus flow rate characteristic curve and to establish the steady state flow rate needed to meet the load demand;

sensing means for sensing the instantaneous flow rate of the fluid at the discharge outlet of the compressor;

means, responsive to said sensing means, for developing a feedback signal which is a function of the sensed flow rate; and regulating means responsive to said feedback signal for dynamically varying the capacity of the compressor to vary the instantaneous operating point alternately back and forth around the steady state operating point and to impart a negative slope to the portion of the pressure-flow characteristic curve over which the instantaneous operating point dynamically varies, thereby preventing surge and stabilizing the operation of the system.

12. A control system for dynamically controlling surge in a compressor-driven system wherein gas flows through a containment circuit including an adjustable capacity compressor, the discharge pressure of the gas at the compressor outlet varying as a function of the gas flow rate, comprising:

sensing means for sensing a predetermined parameter which is subject to substantial variations if surging occurs;

means, responsive to said sensing means, for developing a feedback signal which is a function of said predetermined parameter; and regulating means responsive to said feedback signal for dynamically varying the capacity of the compressor to vary the instantaneous operating point, on the compressor's discharge pressure versus flow rate characteristic curve, alternately back and forth around a steady state operating point and to effect a negative slope to the portion of the pressure-flow curve over which the instantaneous operating point dynamically varies, thereby preventing surge and stabilizing the operation of the compressor-driven system.

* * * * *